United States Patent
Mortensen et al.

(10) Patent No.: US 11,059,719 B2
(45) Date of Patent: Jul. 13, 2021

(54) PROCESS FOR PRODUCING HYDROGEN OR SYNGAS BY METHANOL CRACKING

(71) Applicant: HALDOR TOPSØE A/S, Lyngby (DK)

(72) Inventors: Peter Mølgaard Mortensen, Roskilde (DK); Martin Østberg, Tune (DK); Poul Erik Højlund Nielsen, Fredensborg (DK)

(73) Assignee: HALDOR TOPSØE A/S, Kgs. Lyngby (DK)

(*) Notice: Subject to any disclaimer, the term of this patent is extended or adjusted under 35 U.S.C. 154(b) by 0 days.

(21) Appl. No.: 16/087,943

(22) PCT Filed: Apr. 24, 2017

(86) PCT No.: PCT/EP2017/059594
§ 371 (c)(1),
(2) Date: Sep. 24, 2018

(87) PCT Pub. No.: WO2017/186612
PCT Pub. Date: Nov. 2, 2017

(65) Prior Publication Data
US 2019/0112187 A1  Apr. 18, 2019

(30) Foreign Application Priority Data

Apr. 26, 2016 (DK) .......................... PA 2016 00242

(51) Int. Cl.
*C01B 3/22* (2006.01)
*B01J 19/00* (2006.01)
*H05B 6/22* (2006.01)

(52) U.S. Cl.
CPC ............ *C01B 3/22* (2013.01); *B01J 19/0013* (2013.01); *H05B 6/22* (2013.01);
(Continued)

(58) Field of Classification Search
CPC ........................................................ C01B 3/22
See application file for complete search history.

(56) References Cited

U.S. PATENT DOCUMENTS 3,260,792 A * 7/1966 Kreisel .................... H01B 7/00
                                                       174/107
3,948,645 A    4/1976 Elvander et al.
(Continued)

FOREIGN PATENT DOCUMENTS

DE     102013214313 A1   1/2015
EP         1570901 A1    9/2005
(Continued)

OTHER PUBLICATIONS

Development of Methanol Decomposition Catalysts for Production of H2 and CO Wu-Hsun Cheng Acc. Chem. Res. V 32, pp. 685-691 (Year: 1999).*
(Continued)

*Primary Examiner* — Douglas B Call
(74) *Attorney, Agent, or Firm* — Buchanan Ingersoll & Rooney P.C.

(57) ABSTRACT

In a process for producing hydrogen or syngas by methanol cracking, whereby methanol is catalytically decomposed into hydrogen and carbon monoxide in an endothermal reaction, said reaction takes place in a reactor with direct inductive heating in the reaction zone. The heating is obtained by passing an alternating current through a metallic coil located inside the reactor or by using induction heated catalyzed hardware in the shape of a ferromagnetic structure, which is coated with an oxide impregnated with the catalytically active phase.

16 Claims, 1 Drawing Sheet

(52) U.S. Cl.
CPC ............... *B01J 2219/00139* (2013.01); *C01B 2203/0277* (2013.01); *C01B 2203/0855* (2013.01); *C01B 2203/1076* (2013.01); *C01B 2203/1082* (2013.01); *C01B 2203/1223* (2013.01)

(56) References Cited

U.S. PATENT DOCUMENTS

| | | | |
|---|---|---|---|
| 4,631,266 | A | 12/1986 | Wold et al. |
| 6,541,142 | B1 | 4/2003 | Yu et al. |
| 2003/0086839 | A1 | 5/2003 | Rivin |
| 2003/0148880 | A1 | 8/2003 | Naka et al. |
| 2006/0210471 | A1 | 9/2006 | Ando et al. |
| 2011/0265738 | A1 | 11/2011 | Ichikawa et al. |
| 2016/0023201 | A1 | 1/2016 | Chaudret et al. |
| 2016/0136610 | A1 | 5/2016 | Wasserscheid et al. |
| 2017/0283258 | A1* | 10/2017 | Hornung ............... B01J 35/008 |

FOREIGN PATENT DOCUMENTS

| | | | |
|---|---|---|---|
| EP | 1607369 | A1 | 12/2005 |
| JP | H09286603 | A | 11/1997 |
| JP | 2000103601 | A | 4/2000 |
| JP | 2004122037 | A | 4/2004 |
| JP | 2011245475 | A | 12/2011 |
| JP | 2012236182 | A | 12/2012 |
| WO | 8504597 | A1 | 10/1985 |
| WO | 2000/005168 | A1 | 2/2000 |
| WO | WO0220197 | * | 3/2002 |
| WO | 2014162099 | A1 | 10/2014 |
| WO | WO2015010820 | * | 1/2015 |

OTHER PUBLICATIONS

Hydrogen production from methanol decomposition over Pt/Al2O3 and ceria promoted Pt/Al2O3 catalysts J. Christopher Brown et al. Catalyst Comm. vol. 5, pp. 431-436 (Year: 2004).*

Hydrogen Production by the Catalytic Steam Reforming of Methanol. Part 3: Kinetics of Methanol Decomposition using C18HC Catalyst. J.C. Amphlett et al. The Canadian Journal of Chemical Engineering, vol. 66, pp. 950-956 (Year: 1988).*

Danish Office Action dated Nov. 30, 2016, issued by the Danish patent and Trademark Office in corresponding Danish Patent Application No. PA 2016 00242. (7 pages).

International Search Report (PCT/ISA/210) dated Jun. 9, 2017, by the European Patent Office as the International Searching Authority for International Application No. PCT/EP2017/059594.

Written Opinion (PCT/ISA/237) dated Jun. 9, 2017, by the European Patent Office as the International Searching Authority for International Application No. PCT/EP2017/059594.

Office Action dated Mar. 3, 2021, by the Japanese Patent Office in corresponding Japanese Patent Application No. 2018-555478, and an English Translation of the Office Action. (6 pages).

\* cited by examiner

PROCESS FOR PRODUCING HYDROGEN OR SYNGAS BY METHANOL CRACKING

TECHNICAL FIELD AND BACKGROUND

The present invention relates to a process for producing hydrogen or syngas, i.e. a mixture of hydrogen and carbon monoxide, by methanol cracking. Methanol cracking is a process, wherein methanol is catalytically decomposed into hydrogen and carbon monoxide according to the endothermal reaction $$CH_3OH \leftrightarrow CO + 2H_2$$

on a catalyst which typically comprises Cu, such as Cu/ZnO. The reaction takes place at moderate temperatures, i.e. from 200 to 400'C, preferably from 200 to 350° C.

Since the above reaction is endothermal, heating is necessary. It has turned out that induction heating is a good candidate to supply the necessary heat for the methanol cracking reaction, because it provides a number of process advantages:

First of all, with induction heating it becomes possible to make an extremely fast start-up, and the energy supplied to the catalyst may be controlled by tuning the electrical coil inducing the magnetic field to the catalytic bed. Furthermore, the magnetically induced heating is permeable to many materials, and therefore it can be applied directly in the active zone of the reaction.

To enable induction heating of the catalyst, the use of induction heated catalyzed hardware is a possibility. In this embodiment, a ferromagnetic structure can be used, which is coated with an oxide impregnated with the catalytically active phase.

Another possibility is to mix the ferromagnetic material with the catalyst. In this embodiment, the ferromagnetic material could be small spheres of FeCr alloy or another magnetic material with a protective oxide film on the surface. This is especially relevant for Cu-based catalysts.

The term "catalysed hardware" as used herein refers to a catalyst system, where a layer of catalyst is placed on a surface of another material, e.g. a metal. The term "porous structure stabilised catalysed hardware" refers to a catalyst system, where a porous structure made from a material, which is stronger than the catalyst, is adhered to the other material and the catalyst is deposited in the cavities of the porous structure. While the porous structure is in general considered to be made from a metal, any porous material, which is stronger than the catalytic material, can in principle be used.

Catalyzed hardware in different forms can be used for various purposes. For example, the formaldehyde synthesis reaction using catalysed hardware is known from i.a. Applicant's EP 1 570 901. Here the catalyzed hardware is in the form of structured elements with a coating of a catalytic layer. The catalytic layer can be coated directly onto the outside of tubes. Also, the structured elements can be catalyst systems where a layer of catalyst is fixed onto a surface of another material, the other material serving as a supporting structure giving strength to the system. The other material can be metallic or ceramic. Examples are monoliths, cross-corrugated structures, high surface area structured elements, foams, plates, structures attached to tube walls or other suitable shapes.

Further, applicant's WO 2000/005168 is directed to the production of synthesis gas by steam reforming of a hydrocarbon feedstock in contact with catalyzed hardware. Induction heating is the process of heating an electrically conducting object (usually a metal) by magnetic induction, through heat generated in the object by eddy currents (also called Foucault currents, which are loops of electrical current induced within conductors by a changing magnetic field in the conductor, due to Faraday's law of induction) and/or hysteresis loss. Eddy currents flow in closed loops within conductors, in planes perpendicular to the magnetic field.

An induction heater consists of an electromagnet and an electronic oscillator which passes a high-frequency alternating current (AC) through the electromagnet. The rapidly alternating magnetic field penetrates the object, whereby electric currents inside the conductor called eddy currents are generated. The eddy currents flowing through the resistance of the material will heat it by Joule heating. Eddy current heating is also denoted ohmic heating. In ferromagnetic (and ferromagnetic and antiferromagnetic) materials like iron, heat may alternatively or additionally be generated by magnetic hysteresis losses. This is denoted ferromagnetic heating. The frequency of the current used depends on the object size, material type, coupling (between the induction coil and the object to be heated) and the penetration depth. An induction coil comprising a conductor bent into the form of a plurality of loops or windings is an example of an electromagnet.

Inductive heating is generally carried out using an alternating current, often of high frequency, which is passed through a metallic coil. The subject to be heated is placed inside the coil. This procedure is, however, not very energy efficient, because the magnetic field generated by the coil will continue also outside the coil. While this drawback may be avoided by shaping the coil as a torus, there will still be a loss due to the resistance in the coil, i.e. the ohmic heat, which normally will be lost for the process.

The use of induction heating in connection with chemical reactions is known from U.S. Pat. No. 2,519,481 relating to temperature control of chemical reactions and more particularly to the use of induction heating, especially high frequency induction heating, for accurately controlling the temperature in a reaction zone.

WO 2014/162099 A1 describes a method for heterogeneous catalysis of a chemical reaction, which uses at least one reagent and a catalytic composition that can catalyze the reaction within a given range of temperatures T. At least one reagent is brought into contact with the catalytic composition, which includes a ferromagnetic nanoparticulate component whose surface is formed at least partially by a compound that is a catalyst for the reaction. The nanoparticulate component is heated by magnetic induction in order to reach a temperature within the range of temperatures T, and the reaction product(s) formed on the surface of the nanoparticulate component is/are recovered. The nanoparticulate component of the catalytic composition can be heated to the reaction temperature by magnetic induction, and the catalyst is heated by the effect of the magnetic field. The method makes it possible to obtain a significant reduction in the amount of energy needed for a given reaction. In WO 2014/162099 A1, the range of temperatures T is given to be between 300 and 500'C. Thus, the document describes a catalyst to be used in the catalysis of chemical reactions within a relatively limited temperature range.

DETAILED DESCRIPTION

Figure 1:
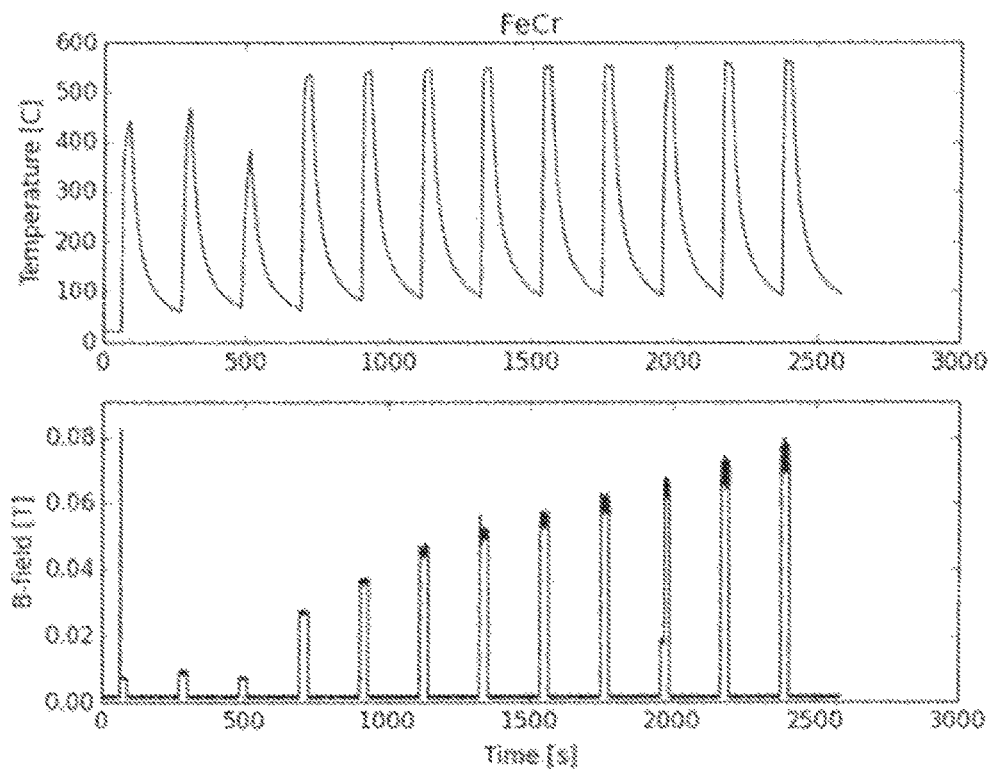
FIGS. 1 and 2 show heating profiles of Fe—Cr and Alnico alloys in a varying magnetic field.

Thus, the present invention relates to a process for producing hydrogen or syngas by methanol cracking, whereby methanol is catalytically decomposed into hydrogen and carbon monoxide in an endothermic reaction:

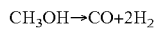
$$CH_3OH \rightarrow CO + 2H_2$$

said reaction taking place in a reactor with direct inductive heating in the reaction zone. The inductive heating can be obtained by passing an alternating current through a metallic coil located inside the reactor.

Preferably the catalyst comprises Cu, such as Cu/ZnO, and the metallic coil is copper wire. The Cu coil can be un-isolated, thereby having electrical contact with the catalyst.

The inductive heating can also be obtained using induction heated catalyzed hardware in the shape of a ferromagnetic structure, which is coated with an oxide impregnated with the catalytically active phase. The ferromagnetic structure is preferably composed of metals of Fe—Cr or Al—Ni—Co alloys.

The oxide coated onto the ferromagnetic structure is preferably an oxide made of a combination comprising Al, Zr and/or Ce. The oxide surface can be impregnated with a catalytic phase suitable for methanol cracking. Preferably said catalytic phase comprises Cu, such as Cu/ZnO.

The endothermic nature of methanol cracking means that heating is required throughout the reaction, both to achieve sufficient conversion and also to avoid condensation of the methanol. With induction heating, efficient heating can be facilitated, and the risk of condensation is practically avoided, because heating necessary for the reaction is supplied within the reaction zone where the energy is consumed.

The methanol cracking is carried out in a reactor unit arranged to accommodate the catalyst material comprising one or more ferromagnetic macroscopic supports susceptible for induction heating, where the one or more ferromagnetic macroscopic supports are ferromagnetic at temperatures up to an upper limit of the given temperature range T. Said one or more ferromagnetic macroscopic supports are each coated with an oxide, said oxide being impregnated with catalytically active particles. The methanol cracking reactor (the "methanol cracker") further comprises an induction coil arranged to be powered by a power source supplying alternating current and being positioned so as to generate an alternating magnetic field within the cracker upon energization by the power source, whereby the catalyst material is heated to a temperature within the given temperature range T by means of the alternating magnetic field.

The catalyst itself can be ferromagnetic, antiferromagnetic or non-magnetic. In the latter case, the catalyst can be mixed with a ferromagnetic material, for example iron beads or—for reactions at very high temperatures—metallic cobalt.

The one or more ferromagnetic macroscopic supports are ferromagnetic at temperatures up to at least an upper limit of the given temperature range T, viz. also at temperatures above the upper limit of the given temperature range T. The term "up to an upper limit of the given temperature range T" is meant to denote appropriate temperatures up to this upper limit, such as any temperature between the standard ambient temperature and the upper limit of the given temperature range T.

When the catalyst material within the methanol cracker comprises one or more ferromagnetic macroscopic supports comprising catalytically active particles, these active particles are heated from the heating of the ferromagnetic macroscopic supports. The catalytically active particles may thus be any appropriate paramagnetic or ferromagnetic element or combination of appropriate paramagnetic or ferromagnetic elements. An important feature of the induction heating process is that the heat is generated inside the object itself, instead of being heated by an external heat source via heat conduction. This means that objects can be very rapidly heated.

However, if the catalytically active particles are ferromagnetic themselves, they will be heated indirectly by the induction heating of the macroscopic supports as well as directly by the magnetic field. Hereby, a very fast heating rate directly in the catalytically active particles is achievable as well. Moreover, a catalyst material which, upon being subjected to an alternating magnetic field, is ferromagnetic at relevant operating conditions, such as at any relevant temperature up to the upper limit of the temperature range T, and possibly above, is advantageous as it will be explained below.

For ferromagnetic materials, induction heating takes place by both ferromagnetic/hysteresis heating and ohmic/eddy current heating. An estimation of the hysteresis heating is given by the formula: $P = \oint B dH \cdot f$, where P denotes the heating power transferred to the material, B the magnetic flux density, dH the change in the magnetic field strength, and f the frequency of the alternating magnetic field. Thus, the heating power transferred to the material by hysteresis heating is the area of the hysteresis curve multiplied by the frequency of the alternating magnetic field. An estimation of the ohmic/eddy current heating is given by the formula $P = \pi/20 \cdot B_m^2 \cdot I^2 \cdot \sigma \cdot f^2$, where P denotes the heating power transferred to the material, $B_m$ is the magnetic flux density induced in the material, I is a characteristic length of the material, σ is the conductivity of the material and f is the frequency of the alternating magnetic field. Thus, the heating power transferred to the material by eddy current heating is proportional to the magnetic flux density squared as well as the frequency of the alternating magnetic field squared. Paramagnetic materials have a very small magnetic flux density B when subjected to an alternating magnetic field compared to ferromagnetic materials. Therefore, ferromagnetic materials are much more susceptible to induction heating than non-ferromagnetic materials, and either alternating magnetic fields of a lower frequency are usable for ferromagnetic materials compared to non-ferro-magnetic materials, or a lower frequency of the alternating magnetic field may be used. Generating a high-frequency magnetic field is relatively expensive energetically, so the use of a lower frequency of the magnetic field provides for cheaper heating of the material. Here, a high-frequency magnetic field is meant to be a field having a frequency in the MHz range, may be from to 0.1 or 0.5 MHz and upwards.

A ferromagnetic material provides for further advantages, such as the following:

Ferromagnetic materials absorb a high proportion of the magnetic field, thereby making the need for shielding less important or even superfluous.

Heating of ferromagnetic materials is relatively faster and cheaper than heating of non-ferromagnetic materials. A ferromagnetic material has an inherent or intrinsic maximum temperature of heating, viz. the Curie temperature. Therefore, the use of a catalyst material which is ferromagnetic ensures that an endothermic chemical reaction is not heated beyond a specific temperature, viz. the Curie temperature. Thus, it is ensured that the chemical reaction will not run out of control.

Figure 2:
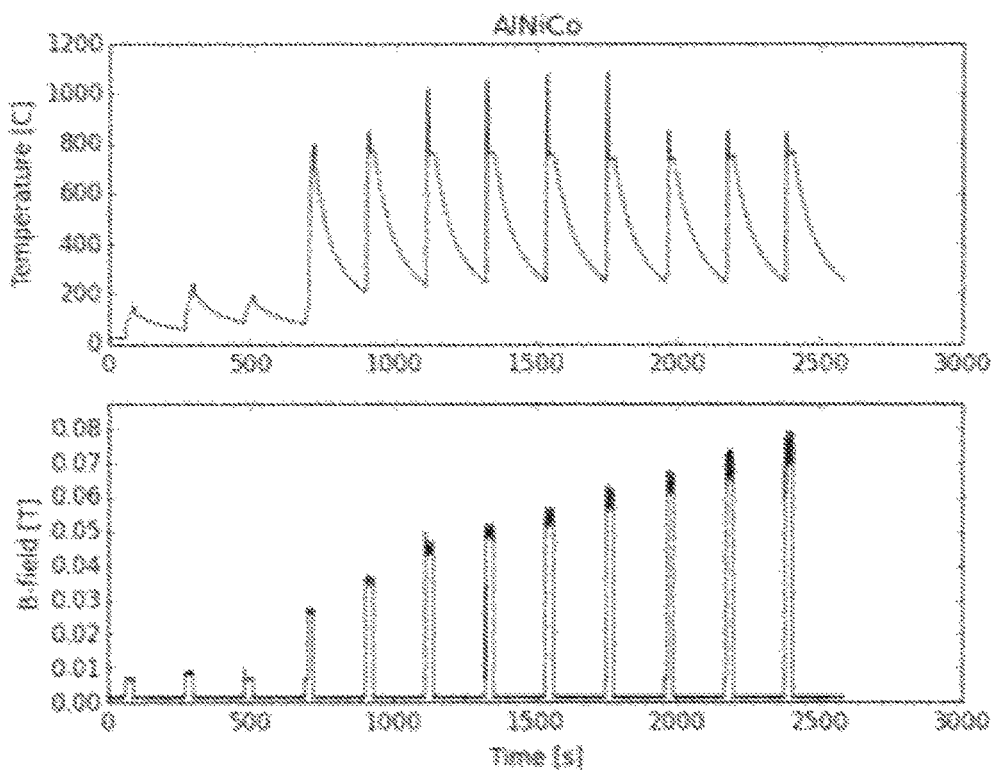

Induction heating enables heating with a heat output of more than 70 W/g, which gives heating rates of more than 150'C/s. Thus, induction heating offers a way of very fast and effective heating. This is illustrated in FIGS. 1 and 2, showing how the temperature of an Al—Ni—Co (Alnico) alloy subjected to varying magnetic fields develops as a function of time. Specifically, FIGS. 1 and 2 show heating profiles of Fe—Cr and Alnico alloys in a varying magnetic field.

In both Figures, the temperature is shown in the top graph and the variation in the magnetic field is shown in the bottom graph.

FIG. 1 shows the heating profile of Fe—Cr alloy as a function of time at a magnetic field strength varied between 0.01 T and 0.08 T and a frequency of 55.7 kHz, where T is a temperature range relevant for carrying out the chemical reaction. From the profiles of FIG. 1 it is apparent that a very rapid heating can be achieved by induction, with a heating rate of around 160° C./s, corresponding to a heat input of 72 W/g. From FIG. 1 it is seen that the temperature achievable is limited by the Curie temperature, which is the temperature at which certain materials lose their permanent magnetic properties, and heating is significantly slower above this. Therefore, the heating profile flattens at 550-560° C.

In contrast to the Fe—Cr alloy, an Alnico alloy has a somewhat higher Curie temperature. Therefore, a higher temperature can be achieved with an Alnico alloy, easily reaching 800'C, as shown in FIG. 2. The spikes in the temperature profile of FIG. 2, going from about 800° C. to up to more than 1000° C., are to be seen as measurement errors.

Overall, both Fe—Cr alloys and Alnico alloys may be heated with high intensity and with a heating rate of more than 150'C/s. The most evident difference between the materials is their Curie temperature which will limit their use. The lower Curie temperature of the Fe—Cr alloy means that it can be used only at temperatures up to around 550° C., whereas the Alnico alloy may be heated by induction up to at least 800° C.

It is expected that the maximum temperature, to which the alloys may be heated, will be increased slightly by incorporating a ferromagnetic phase with a higher Curie temperature in the oxide coating.

It should be stressed that the measurements above are very sensitive to the placement of the thermocouple, indicating the temperature, on the sample and also the sample dimension and shape of the catalyst material due to shielding effects of the magnetic field.

Moreover, it should be stressed that the measurement shown in FIGS. 1 and 2 are only two examples of the magnetic field used, and also that a large range of values of the magnetic field strength and the frequency of the magnetic field is conceivable. In general, a low frequency magnetic field having a relatively high magnetic field strength will provide good induction heating. More specifically, the magnetic field generated by induction advantageously has an amplitude between about 5 mT and about 1000 mT, preferably between about 5 and about 200 mT, and a frequency of between about 0.5 kHz and about 400 kHz.

Combinations of a ferromagnetic structure and a suitable coating have been identified. The best cases were found to be those in which the structure is composed of metals of Fe—Cr or Al—Ni—Co alloys.

The Fe—Cr alloy has a Curie temperature of around 560° C., which is clearly sufficient for methanol cracking. The coating is oxide-based, and it can be an oxide made of a combination of Al, Zr, Ce etc.

The coated metal structure has a porous oxide surface which can be impregnated with practically any catalytic phase. It can therefore be matched to any conventional catalysts for methanol cracking, which typically comprise Cu, such as Cu/ZnO.

It may be difficult to obtain sufficient activity in this manner. Thus, an alternative possibility is to dilute the conventional catalyst with a magnetic material.

The heating is supplied from inside the reactor, making the catalyst the hottest part of the reactor. This means that no large and expensive pre-heating equipment is needed for start-up. The extremely fast heating makes start-up practically instantaneous.

The invention is illustrated further by the example which follows.

EXAMPLE

A methanol synthesis catalyst, such as applicant's MK-121 catalyst, is mixed, in a volume ratio of 1:1, with superficially oxidized spheres of Fe—Cr alloy.

The mixture is loaded into a tubular reactor within a coil made of Kanthal-type (Fe—Cr—Al alloy) wire, which resists reducing gases. The coil is separated from the reactor wall by an isolation layer.

By inductive heating, the reactor is brought to a temperature of 200° C., where the catalyst is activated by means of a stream of 2% $H_2$ in $N_2$ until all copper oxide has been reduced to elemental Cu.

The reduced Cu catalyst contains around 50 wt % Cu as small ~100 Å particles.

Then the catalyst is subjected to a stream of methanol, which may be diluted with water. The following reactions take place at a typical pressure of 20 bar:

$$CH_3OH + H_2O \leftrightarrow 3H_2 + CO_2$$

$$CH_3OH \leftrightarrow 2H_2 + CO$$

$$CO + H_2O \leftrightarrow CO_2 + H_2$$

If the desired product is hydrogen, the reaction mixture will typically be equimolar amounts of methanol and water. 1000 $Nm^3$ of $H_2$ requires around 15 kmol of methanol and a heat input of 260 kWh at 200-250° C.

If the desired product is CO, then only a slight amount of water is used in the reaction, and the temperature should be above 300'C. 1000 $Nm^3$ of CO requires around 45 kmol of methanol and a heat input of 1.3 MWh.

The processing of the gas streams takes place using conventional technology. The spent catalyst is separated magnetically.

The invention claimed is:

1. A process for producing hydrogen/carbon dioxide or syngas by methanol cracking, whereby methanol is catalytically decomposed into hydrogen and carbon monoxide in a first endothermal reaction:

$$CH_3OH \rightarrow CO + 2H_2$$

and/or into hydrogen and carbon dioxide in a second endothermic reaction:

$$CH_3OH + H_2O \leftrightarrow 3H_2 + CO_2$$

said reactions taking place in a reactor with a reaction zone, the reaction zone comprising a catalyst in the form of induction heated catalyzed hardware, with direct inductive heating in the reaction zone, wherein the direct inductive heating is obtained using the induction heated catalyzed hardware, wherein the induction heated catalyzed hardware is a ferromagnetic structure, which is coated with a non-catalyst oxide impregnated with a catalytically active phase.

2. Process according to claim 1, wherein the direct inductive heating is obtained by passing an alternating current through a metallic coil located inside the reactor.

3. Process according to claim 2, wherein the metallic coil is copper wire.

4. Process according to claim 3, wherein the metallic coil is in electrical contact with the catalyst.

5. Process according to claim 2, wherein the direct inductive heating is obtained by an alternating magnetic field.

6. Process according to claim 1, wherein the catalyst comprises Cu.

7. Process according to claim 1, wherein the ferromagnetic structure is composed of metals of Fe—Cr or Al—Ni—Co alloys.

8. Process according to claim 1, wherein the oxide coated onto the ferromagnetic structure is an oxide comprising at least one of Al, Zr, and Ce.

9. Process according to claim 8, wherein a surface of the oxide is impregnated with a catalytic phase suitable for methanol cracking.

10. Process according to claim 9, wherein the catalytic phase comprises Cu.

11. Process according to claim 1, wherein the direct inductive heating takes place by both ferromagnetic/hysteresis heating and ohmic/eddy current heating.

12. Process according to claim 1, wherein the catalytically active phase is ferromagnetic.

13. Process according to claim 1, wherein the methanol is gaseous methanol.

14. A process for producing hydrogen/carbon dioxide or syngas by methanol cracking, whereby methanol is catalytically decomposed into hydrogen and carbon monoxide in a first endothermal reaction:

$CH_3OH \rightarrow CO+2H_2$ and/or into hydrogen and carbon dioxide in a second endothermic reaction:

$CH_3OH+H_2O \leftrightarrow 3H_2+CO_2$ said reactions taking place in a reactor with a reaction zone, the reaction zone comprising a catalyst in the form of induction heated catalyzed hardware, with direct inductive heating in the reaction zone, wherein the direct inductive heating is obtained using the induction heated catalyzed hardware, wherein the induction heated catalyzed hardware is a ferromagnetic support structure.

15. Process according to claim 14, wherein the methanol is gaseous methanol.

16. Process according to claim 15, wherein the induction heated catalyzed hardware is a ferromagnetic structure, which is coated with a non-catalyst oxide impregnated with a catalytically active phase.

* * * * *